United States Patent [19]

Iwafune et al.

[11] 4,455,758
[45] Jun. 26, 1984

[54] BEARING MEANS FOR ANGLE MEASURING INSTRUMENTS

[75] Inventors: Yasuo Iwafune; Yuji Kobayashi, both of Tokyo, Japan

[73] Assignee: Tokyo Kogaku Kikai Kabushiki Kaisha, Japan

[21] Appl. No.: 486,871

[22] Filed: Apr. 20, 1983

Related U.S. Application Data

[63] Continuation of Ser. No. 242,281, Mar. 10, 1981, abandoned.

[30] Foreign Application Priority Data

Mar. 12, 1980 [JP] Japan ................................ 55-31336
Mar. 17, 1980 [JP] Japan ............................ 55-34738[U]

[51] Int. Cl.³ .......................... G01C 1/02; F16C 35/04
[52] U.S. Cl. ........................................ 33/282; 33/299; 308/184 R
[58] Field of Search ................ 33/281, 282, 283, 284, 33/290, 291, 292, 299; 356/138, 253; 308/184 R, 189 A, DIG. 11

[56] References Cited

U.S. PATENT DOCUMENTS

| 989,258 | 4/1911 | Hess | 308/184 R |
|---|---|---|---|
| 1,557,848 | 10/1925 | Kirner | 308/184 R |
| 1,705,281 | 3/1929 | Bott | 308/189 A |
| 2,506,404 | 5/1950 | Woodfield et al. | 308/184 R |
| 2,531,252 | 11/1950 | Brunson | 33/299 |
| 2,602,229 | 7/1952 | Larsen et al. | 33/299 |
| 2,803,507 | 8/1957 | Mempel et al. | 308/184 R |
| 2,857,765 | 10/1958 | Kiefer, Jr. | 308/184 R |

FOREIGN PATENT DOCUMENTS 297561 8/1932 Italy ........................................ 33/282

Primary Examiner—Richard R. Stearns
Attorney, Agent, or Firm—Brumbaugh, Graves, Donohue & Raymond

[57] ABSTRACT

An angle measuring instrument such as a theodolite having a housing containing a viewing optical system. The housing has a pair of axially aligned horizontal shafts through which it is mounted on a support frame for a swingable movement in a vertical plane. The shafts are mounted on the frame through ball bearings having inner and outer races. One of the inner and outer races is preloaded in the axial direction so that a stable movement of the bearing is ensured.

6 Claims, 7 Drawing Figures

BEARING MEANS FOR ANGLE MEASURING INSTRUMENTS

This application is a continuation of application Ser. No. 242,281, filed on Mar. 10, 1981 now abandoned.

The present invention relates to an angle measuring instrument such as a theodolite and particularly to means for mounting the horizontal shaft thereof.

Conventional angle measuring instruments of the aforementioned type include a housing containing an observing optical system and mounted on a support frame for swingable movement through horizontal shafts provided on the housing. The horizontal shafts are carried by bearings which are generally of a sleeve type so that a precise and accurate measurement can be ensured. The sleeve type bearing may be of a one-piece construction or of a two-piece construction including bearing elements of a semicircular cross-section. In either of the types, the horizontal shafts are encircled by the bearing sleeves so that it is required to fit the shafts to the bearing sleeves with a high precision. If there is any eccentricity between the shafts, there will be produced a precession of the shafts which causes a measuring error. The eccentricity between the shafts has a direct influence on the accuracy of measurement and it has been absolutely necessary to machine the shafts and bearings with very high precision. Where the fitting engagement between the shaft and the bearing is of a poor precision, there will be produced a play between the shaft and the bearing in addition to an inaccurate measurement.

In an arrangement where a heavy instrument such as an electro-optical distance measuring device is mounted on an angle measuring instrument, the shafts for mounting the housing on the support frame are further subjected to an unbalanced load, and the bearing may be damaged due to the unbalanced load. Thus, it may become necessary to replace the damaged bearing and sometimes the horizontal shaft together with the bearing.

It is therefore an object of the present invention to provide an angle measuring instrument in which the aforementioned problems are eliminated.

Another object of the present invention is to provide an angle measuring instrument in which commercially available bearings can be used without producing any problem of measuring accuracy.

According to the present invention, the above and other objects can be accomplished by an angle measuring instrument including a housing containing a viewing optical system, support shaft means provided on said housing, support frame means, ball bearing means for mounting said support shaft means on said support frame means so that said housing can be swung in a vertical plane, said bearing means including inner race means, outer race means and bearing ball means between said inner and outer race means, said support shaft means being in fitting engagement with said inner race means of the bearing means, said outer race means of the bearing means being mounted on said support frame means, bias means for applying a preload to at least one of said inner and outer race means in the axial direction of the shaft means so that stable rolling traces are provided for the bearing ball means on the inner and outer race means.

According to the features of the present invention, it is possible to provide a rotating reference surface by the inner race means of the ball bearing means. Thus, an accurate rotation of the shaft means can be ensured without a high precision of the engagement between the shaft means and the inner race means of the bearing means. Since the inner and/or outer race means is axially biased, the accuracy of measurement can further be ensured. The bias force may preferably be 3 to 5 kg and may be provided by an annular resilient member.

Where ball bearings are used for mounting the housing, the movement may become so smooth that the housing may be moved even under a very small change of the center of the gravity of the housing, such change being possibly produced for example when a focusing lens of the optical system is moved. Thus, according to a preferable further feature of the present invention, the bearing ball means or the inner race means is applied with a resistance force by means of rotation restricting means. Such restriction means may be embodied by sliding contact means which is in slidable contact with the ball means or the inner race means. Alternatively, the restriction means may be constituted by a viscous agent filled in the bearing means.

The above and other objects and features of the present invention will become apparent from the following descriptions of preferred embodiments taking reference to the accompanying drawings, in which.

Figure 1:
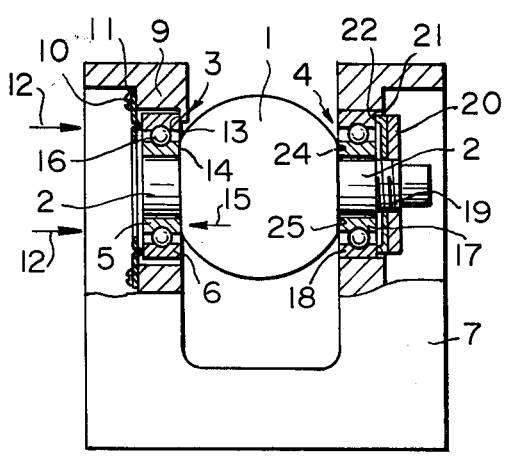
FIG. 1 is a partially broken end view of a theodolite embodying the features of the present invention.

Referring now to the drawings, particularly to FIG. 1, there is shown a theodolite including a telescope tube or housing 1 having a viewing optical system arranged therein. The housing 1 has a pair of axially aligned shafts 2 extending sidewardly from the housing 1. The housing 1 is mounted at the shafts 2 on a support frame 7 through ball bearings 3 and 4. The ball bearing 3 is comprised of an inner race 5 and an outer race 6, with bearing balls 16 interposed therebetween. One of the shafts 2 is fitted to the inner race 5 and the outer race 6 is attached to the support frame 7. An annular biasing spring 11 is attached to the frame 7 at a support arm portion 9 thereof by means of screws 10 so that the spring 11 engages the axial outer end surface of the outer race 6 to thereby bias the outer race 6 in the direction shown by an arrow 12. The axial inner end surface of the outer race 6 is engaged with a bearing surface 13 formed on the support frame 7.

Figure 7:
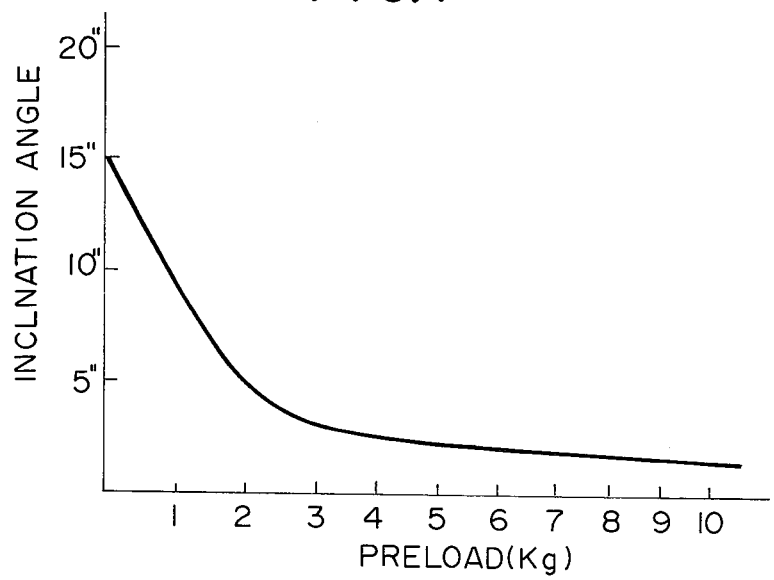
FIG. 7 is a diagram showing the relationship between the biasing preload and the inclination angle of the shaft.

The shaft 2 is formed at the outer end with external screw threads 19, and a retaining ring 20 is threadably engaged with the shaft 2. Between the retaining ring 20 and the bearing 4, there is provided a disc spring 21 which has an axially extending portion 22 contacting with the axially outer surface of the outer race 18. The axially inner end surface 24 of the inner race 17 is in contact with the flat surface 25 formed at the adjacent side portion of the housing 1. According to the arrangement described above, the bearings 3 and 4 are held firmly between the spring 11 and the retaining ring 20 under a suitable axial preload. The preload applied to the outer race 18 should preferably be 3 to 5 kg. As shown in FIG. 7, where the preload less than 3 kg., the axes of the shafts 2 are inclined remarkably from the horizontal line when the housing 1 is swung in a vertical plane due to a precession of the bearing. The preload exceeding 5 kg. may possibly produce seizure of the bearing. It should of course be noted that the spring 11 may not necessarily be of an annular form but may take any suitable configuration.

Figure 2:
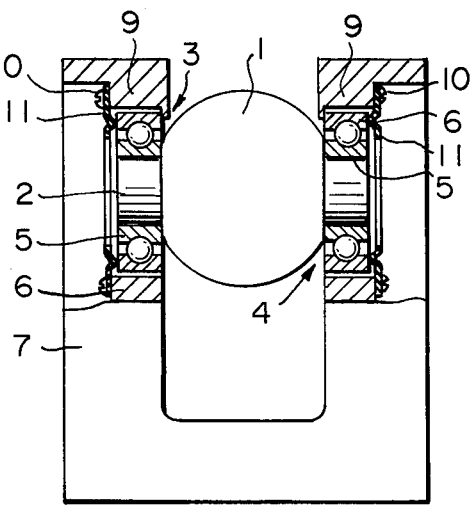
FIG. 2 is an end view similar to FIG. 1 but showing another embodiment of the present invention.
Figure 3:
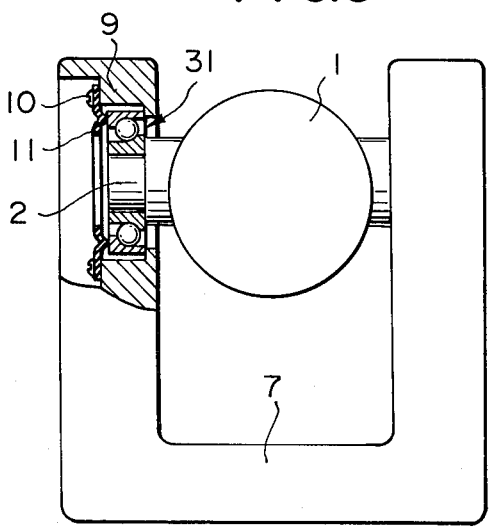
FIG. 3 is an end view showing a further embodiment of the present invention.

Referring to FIG. 2, there is shown another embodiment of the present invention, in which corresponding parts are designated by the same reference numerals in FIG. 1. In this embodiment, the outer race of the bearing 4 is also supported by a spring 11 as in the case of the bearing 3. Referring now to FIG. 3, there is shown a further embodiment of the present invention in which an angular contact bearing 31 is used for mounting the shaft 2. In other respects, the arrangements are the same as in the embodiments shown in FIGS. 1 and 2.

Figure 4:
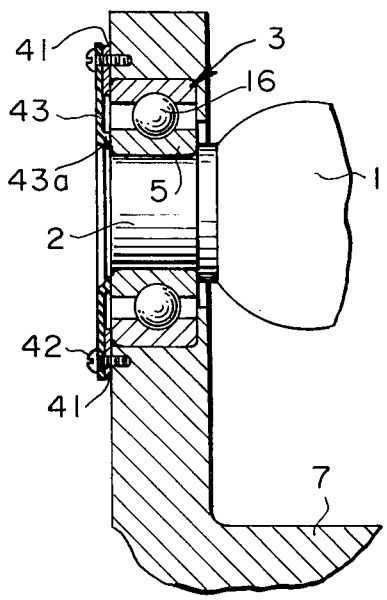
FIG. 4 is a fragmentary sectional view showing an embodiment having a rotation restricting member.

Referring now to FIG. 4, there is shown a further embodiment of the present invention which includes means for constraining movements of a movable element in the bearing. Where ball bearings of commercially available type are used for mounting the telescope housing 1, the swingable movement of the housing 1 may become so smooth that it may often be displaced from an adjusted position for example when a focusing lens is moved. In accordance with this embodiment, an annular resilient member 43 is attached to the frame 7 through a spring washer 41 by means of screws 42 with an inner peripheral portion 43a in slidable frictional contact with the inner race 5 of the bearing 3.

Figure 5:
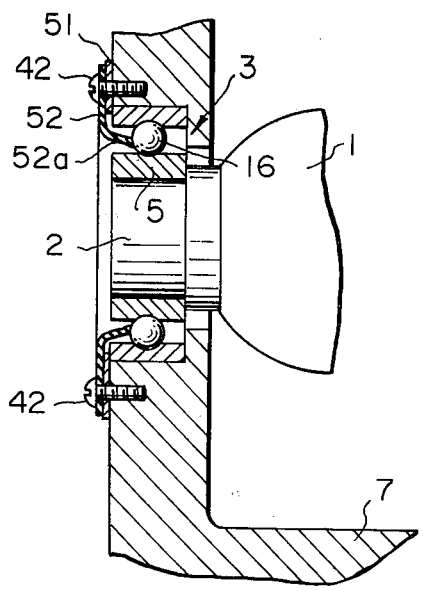
FIG. 5 is a fragmentary sectional view similar to FIG. 4 but showing a different embodiment.

In the embodiment shown in FIG. 5, a friction member 52 made of a resilient material, such as nitrile rubber, is attached to the frame 7 through a spring washer 51 by means of screws 42 and provided at an inner peripheral portion with a lip 52a which is in slidable frictional contact with the bearing balls 16. In this embodiment, an axial biasing member may be provided on the other bearing.

Figure 6:
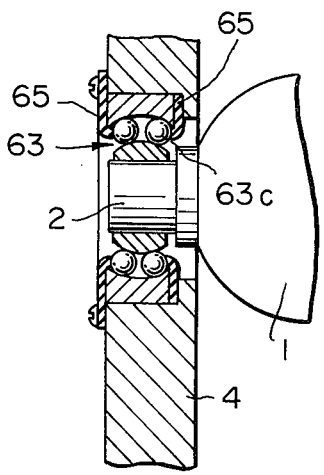
FIG. 6 is a fragmentary sectional view similar to FIGS. 4 and 5 but showing another embodiment.

FIG. 6 shows an embodiment using a self-centering ball bearing 63 having bearing balls 63c. Friction members 65 are disposed at the opposite sides of the bearing 63 and having inner peripheries which are in slidable frictional contact with the balls 63c.

FIGS. 4, 5, and 6 show means for constraining movement of a movable element of the bearing: FIG. 4 shows means for constraining movement of the inner race of the bearing, and FIGS. 5 and 6 show means for constraining movement of the bearing balls. In another embodiment of the invention, which is not illustrated, means are provided for constraining movement of both the inner race of the bearing and the bearing balls.

The invention has thus been shown and described with reference to specific embodiments, however, it should be noted that the invention is in no way limited to the details of the illustrated structures but changes and modifications may be made without departing from the scope of the appended claims.

We claim:

1. An angle measuring instrument including a housing containing a viewing optical system, a pair of shafts provided at the opposite sides of said housing, support frame means, said shafts being respectively mounted on said support frame means through ball bearing means so that said housing can be swung in a vertical plane, said ball bearing means including inner race means, outer race means, and bearing ball means between said inner and outer race means; one of said outer race means being supported by said support frame means in a radial direction without being constrained in an axial direction, said support shafts being respectively in fitting engagement with said inner race means of said ball bearing means, and bias means being engaged with one of said support shafts and being pressed by a retaining member which is fixed on said shaft for applying a preload to said one outer race means of said ball bearing means in an axial direction of the shaft means.

2. An angle measuring instrument in accordance with claim 1 in which said bias means includes a resilient member for applying an axial preload to said one outer race means.

3. An angle measuring instrument in accordance with claim 2 in which said resilient member is of annular configuration and has an axially extending portion for contacting with the axially outer surface of said one outer race means.

4. An angle measuring instrument in accordance with claim 1 in which said bias means is designed to apply an axial load of 3 kg. to 5 kg.

5. An angle measuring instrument in accordance with claim 1 which further includes rotation restricting means for applying a resistance to a movement of the other of said ball bearing means.

6. An angle measuring instrument in accordance with claim 5 in which said rotation restricting means includes sliding contact means which is in slidable frictional contact with one of the bearing ball means or the inner race means.

* * * * *